United States Patent
Teo et al.

(10) Patent No.: US 12,154,389 B2
(45) Date of Patent: Nov. 26, 2024

(54) SYSTEM AND METHOD FOR FORECASTING BATTERY STATE WITH IMPERFECT DATA

(71) Applicant: TOYOTA RESEARCH INSTITUTE, INC., Los Altos, CA (US)

(72) Inventors: Linnette Teo, Seattle, WA (US); Chirranjeevi Balaji Gopal, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 564 days.

(21) Appl. No.: 17/194,802

(22) Filed: Mar. 8, 2021

(65) Prior Publication Data
US 2022/0284747 A1  Sep. 8, 2022

(51) Int. Cl.
| | | |
|---|---|---|
| G07C 5/08 | (2006.01) | |
| B60L 58/12 | (2019.01) | |
| B60L 58/16 | (2019.01) | |
| G06N 3/04 | (2023.01) | |

(Continued)

(52) U.S. Cl.
CPC .......... *G07C 5/0808* (2013.01); *B60L 58/12* (2019.02); *B60L 58/16* (2019.02); *G06N 3/04* (2013.01); *G06N 3/08* (2013.01); *H01M 10/48* (2013.01); *B60L 2240/545* (2013.01); *B60L 2240/547* (2013.01); *B60L 2240/549* (2013.01); *H01M 2220/20* (2013.01)

(58) Field of Classification Search
CPC ....... G07C 5/0808; B60L 58/12; B60L 58/16; B60L 2240/545; B60L 2240/547; B60L 2240/549; B60L 3/12; B60L 2240/80; B60L 2260/50; G06N 3/04; G06N 3/08; G06N 3/045; G06N 3/084; G06N 20/10; H01M 10/48; H01M 2220/20
See application file for complete search history.

(56) References Cited

U.S. PATENT DOCUMENTS

| | | | |
|---|---|---|---|
| 10,209,314 B2 * | 2/2019 | Garcia | ............... G01R 31/392 |
| 10,310,020 B2 | 6/2019 | Biletska et al. | |
| 2003/0184307 A1 | 10/2003 | Kozlowski et al. | |

(Continued)

OTHER PUBLICATIONS

S. Shen, M. Sadoughi and C. Hu, "Online Estimation of Lithium-Ion Battery Capacity Using Transfer Learning," 2019 IEEE Transportation Electrification Conference and Expo (ITEC), Detroit, MI, USA, 2019, pp. 1-4, doi: 10.1109/ITEC.2019.8790606 (Year: 2019).*

(Continued)

*Primary Examiner* — James J Lee
*Assistant Examiner* — Andrew Sang Kim
(74) *Attorney, Agent, or Firm* — SEYFARTH SHAW LLP (57) ABSTRACT

An approach to forecasting battery health as a dynamic time-series problem as opposed to a static prediction problem is presented. Systems and methods disclosed herein forecast a trajectory to failure by predicting a path to failure as opposed to only predicting when the battery may fail. A machine-learning model is implemented that extracts unique features taken from time-series data, such as time snippets of charging data. The raw time-series data may include current voltage and temperature with complex transformations and without capturing a full cycle, which permits wider applicability to instances of varying depth of discharge (DoD).

14 Claims, 4 Drawing Sheets

(51) Int. Cl.
  *G06N 3/08* (2023.01)
  *H01M 10/48* (2006.01)

(56) References Cited

U.S. PATENT DOCUMENTS

| | | | |
|---|---|---|---|
| 2016/0202324 A1* | 7/2016 | Biletska | B60L 58/12 |
| | | | 702/63 |
| 2016/0209472 A1* | 7/2016 | Chow | G01R 31/367 |
| 2017/0003352 A1 | 1/2017 | Barre et al. | |
| 2018/0026454 A1 | 1/2018 | Belkacem-Boussaid et al. | |
| 2019/0113577 A1 | 4/2019 | Severson et al. | |
| 2019/0157891 A1 | 5/2019 | Chemali et al. | |
| 2020/0081070 A1 | 3/2020 | Chemali et al. | |
| 2020/0164763 A1 | 5/2020 | Holme | |

OTHER PUBLICATIONS

P. Hu, G. Ma, Y. Zhang, C. Cheng, B. Zhou and Y. Yuan, "State of health estimation for lithium-ion batteries with dynamic time warping and deep kernel learning model," 2020 European Control Conference (ECC), St. Petersburg, Russia, 2020, pp. 602-607, doi: 10.23919/ECC51009.2020.9143757. (Year: 2020).*

Y. Li and J. Tao, "CNN and transfer learning based online SOH estimation for lithium-ion battery," 2020 Chinese Control and Decision Conference (CCDC), Hefei, China, 2020 (Year: 2020).*

Li Y, Li K, Liu X, Zhang L. Fast battery capacity estimation using convolutional neural networks. Transactions of the Institute of Measurement and Control. 2020 (Year: 2020).*

K. Liu, Y. Shang, Q. Ouyang and W. D. Widanage, "A Data-Driven Approach With Uncertainty Quantification for Predicting Future Capacities and Remaining Useful Life of Lithium-ion Battery", Mar. 18, 2020 (Year: 2020).*

Richardson, et al., "Gaussian Process Regression for In-situ Capacity Estimation of Lithium-ion Batteries", arXiv:1712.02595v2, Dec. 18, 2017.

Richardson, et al., "Gaussian Process Regression for Forecasting Battery State of Health", Journal of Power Sources, 2017, pp. 209-219.

Iu, et al., "Gaussian Process Regression With Automatic Relevance Determination Kernel for Calendar Aging Prediction of Lithium-Ion Batteries", IEEE Transactions on Industrial Informatics, Jun. 2020, vol. 16, No. 6.

Lucu, et al., "Data-driven Nonparametric Li-ion Battery Ageing Model Aiming at Learning from Real Operation Data—PartA: Storage Operation", Journal of Energy Storage, 2020.

* cited by examiner

| Cell ID | Time(s) | $X_1$ | ... | $X_m$ | $X_{SOH}$ | $y_{RUL}$ (time) |
|---|---|---|---|---|---|---|
| A | $t_1$ | | | | 95 | |
| A | ... | | | | 95 | |
| A | ... | | | | 95 | |
| A | $t_2$ | | | | 95 | |
| A | $t_1$ | | | | 90 | |
| A | ... | | | | 90 | |
| A | ... | | | | 90 | |
| A | $t_2$ | | | | 90 | |

*FIG. 3(d)*

SYSTEM AND METHOD FOR FORECASTING BATTERY STATE WITH IMPERFECT DATA

FIELD OF TECHNOLOGY

The present disclosure relates to vehicle battery health, and more particularly, to machine learning time-series models and data-driven features to forecast battery state of health with limited/imperfect data.

BACKGROUND

Battery health is of vital importance to monitoring and maintaining efficient and reliable operation of a vehicle, particularly in electric, hybrid, and/or autonomous or semi-autonomous vehicles. Commercial and consumer vehicles rely more and more on batteries as a dominant power source, the ability to monitor, maintain, and forecast battery capacity and other health metrics is vital to the operation of the vehicle.

Battery degradation is a path-dependent problem. Therefore capturing temporal elements of predictors and indicators of degradation is necessary to forecast future behavior of batteries. Traditional battery monitoring and prediction systems rely on static prediction. These systems are less efficient and accurate as battery health is a dynamic, time-series problem.

Further, machine learning provides a basis for the design, programming and operation of many aspects of vehicles. Autonomous and semi-autonomous vehicles may be trained according to environmental and situational data allowing the vehicle to operate. Sensors installed and configured on a vehicle, such as an autonomous or semi-autonomous vehicle, provide data to a machine learning system. Systems and models may then be trained and redeployed onto a vehicle for improved performance.

SUMMARY

Aspects of the present disclosure provide an approach to forecasting battery health as a dynamic time-series problem as opposed to a static prediction problem. Aspects of the systems and methods disclosed herein forecast a trajectory to failure by predicting a path to failure as opposed to only predicting when the battery may fail. A machine-learning model is implemented that extracts unique features taken from time-series data, such as 10-20 s snippets of charging data. The raw time-series data may include current voltage and temperature without complex transformations and without capturing a full cycle, which permits wider applicability to instances of varying depth of discharge (DoD).

The noted features may involve physical and technological features in addition to the evolution of such features over time to capture the hysteristic nature of battery performance degradation. In particular, the features can include change in current during constant-voltage hold of a charging cycle to capture degradation of kinetic parameters, time duration over 38 C, cell temperature at peak voltages, and temperature at peak currents to capture co-variance of fundamental system variables.

Thus, the disclosed aspects capture voltage and temperature at a cell level from which the algorithm extracts time-based features from small segments of the charging and discharging portions. Accordingly, the system generates features for each cell and further tracks evolution of the features. Gaussian Process regressors trained on the features then generate state-of-health (SOH) estimates as a function of future time to provide predictions about battery health.

According to one aspect of the present disclosure, a method of forecasting a state-of-health for a battery is provided. According to the method, a first dataset may be obtained and an arbitrary time window may be selected from a subset of the first dataset. At least one feature may be selected from the arbitrary time-window. The subset may be structured for feature extraction by a convolutional filter and an evolution of the at least one feature may be captured using the convolutional filter. A state-of-health model may be generated and the state-of-health model may be trained by inputting the at least one feature, the evolution of the at least one feature, and a future state-of-health as variables. A trajectory to failure for the battery may be predicted based on a trained state-of-health-model.

According to another aspect, a system for forecasting a state-of-health for a battery is provided. The system may include one or more processors and a memory communicably coupled to the one or more processors. The memory may store a behavioral forecast system including instructions that when executed by the one or more processors cause the one or more processors, in response, to generate trajectory to failure. A first dataset may be obtained and an arbitrary time window may be selected from a subset of the first dataset. At least one feature may be selected from the arbitrary time-window. The subset may be structured for feature extraction by a convolutional filter and an evolution of the at least one feature may be captured using the convolutional filter. A state-of-health model may be generated and the state-of-health model may be trained by inputting the at least one feature, the evolution of the at least one feature, and a future state-of-health as variables. A trajectory to failure for the battery may be predicted based on a trained state-of-health-model.

According to another aspect, a battery monitoring system of a vehicle is provided. The battery monitoring system may include one or more processors and a memory communicably coupled to the one or more processors. The memory may store a behavioral forecast system including instructions that when executed by the one or more processors cause the one or more processors, in response, to generate trajectory to failure of the battery. A first dataset may be obtained and an arbitrary time window may be selected from a subset of the first dataset. At least one feature may be selected from the arbitrary time-window. The at least one feature may include at least one of current data, voltage data, capacity data, temperature data or an engineered metric. The subset may be structured for feature extraction by a convolutional filter and an evolution of the at least one feature may be captured using the convolutional filter. A state-of-health model may be generated and the state-of-health model may be trained by inputting the at least one feature, the evolution of the at least one feature, and a future state-of-health as variables. A trajectory to failure for the battery may be predicted based on a trained state-of-health-model.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Figure 1:
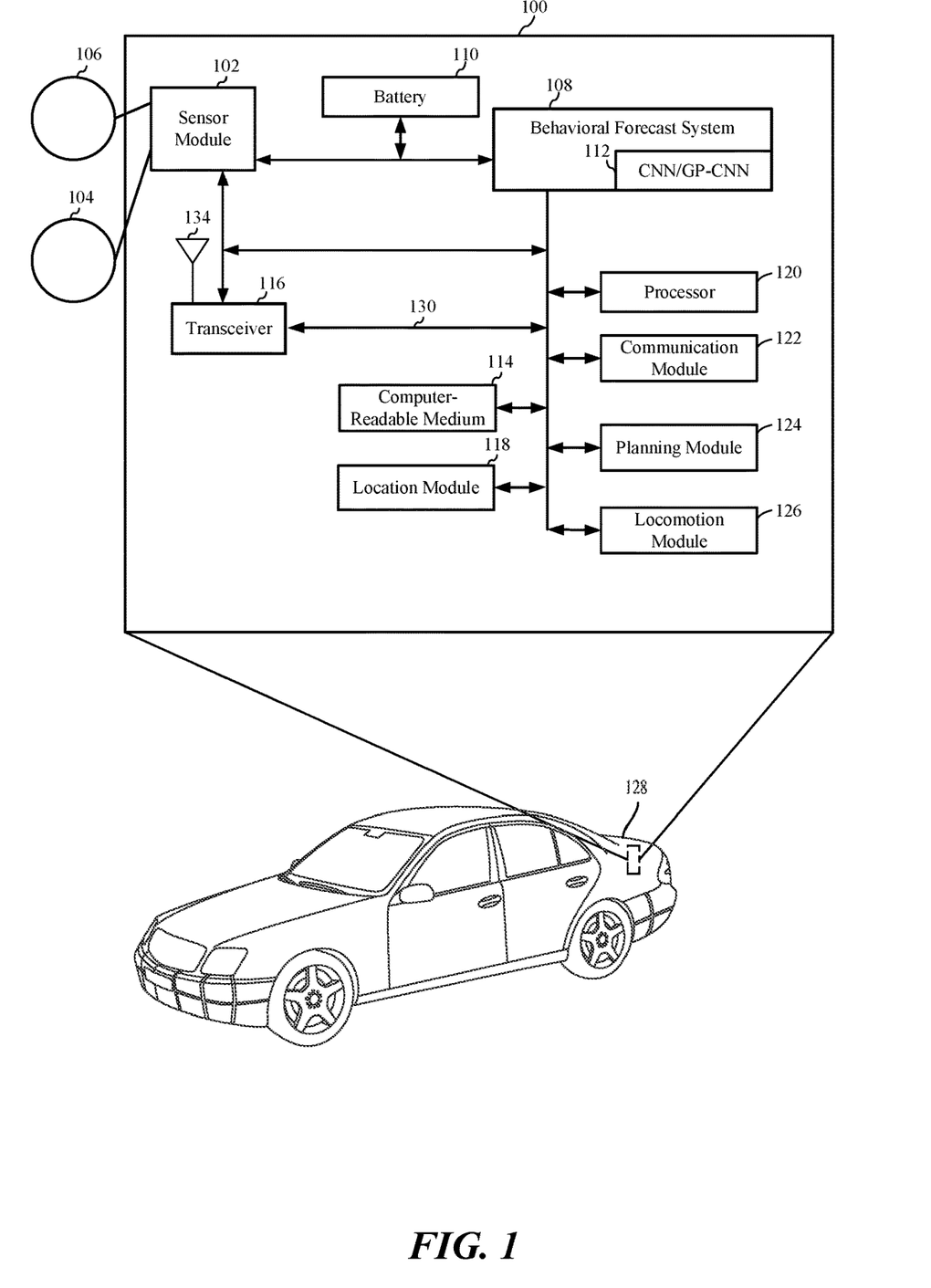
FIG. 1 is a diagram of a vehicle system according to one aspect of the present disclosure.

Aspects of the present disclosure provide an approach to forecasting battery health as a dynamic time-series problem as opposed to a static prediction problem. Aspects of the systems and methods disclosed herein forecast a trajectory to failure by predicting a path to failure as opposed to only predicting when the battery may fail. A machine-learning model is implemented that extracts unique features taken from time-series data, such as 10-20 s snippets of charging data. The raw time-series data may include current voltage and temperature without complex transformations and without capturing a full cycle, which permits wider applicability to instances of varying depth of discharge (DoD). FIG. 1 is a diagram illustrating an example of a hardware implementation for a Battery Management System (BMS) 100, according to aspects of the present disclosure. The BMS 100 may be part of a passenger vehicle, a carrier vehicle, or other device. For example, as shown in FIG. 1, the BMS 100 may be a component of a component of an autonomous or semi-autonomous car 128. Aspects of the present disclosure are not limited to the BMS 100 being a component of the car 128, as other devices, including other battery-driven devices are also contemplated for using the BMS 100.

The BMS 100 may be implemented with a bus architecture, represented generally by a bus 130. The bus 130 may include any number of interconnecting buses and bridges depending on the specific application of the BMS 100 and the overall design constraints. The bus 130 may link together various circuits including one or more processors and/or hardware modules, represented by a processor 120, a communication module 122, a location module 118, a sensor module 102, a locomotion module 126, a planning module 124, and a computer-readable medium 114. The bus 130 may also link various other circuits such as timing sources, peripherals, voltage regulators, and power management circuits, which are well known in the art, and therefore, will not be described any further.

The BMS 100 may include a transceiver 116 coupled to the processor 120, the sensor module 102, a behavioral forecast system 108, the communication module 122, the location module 118, the locomotion module 126, the planning module 124, and the computer-readable medium 114. The transceiver 116 is coupled to an antenna 134. The transceiver 116 communicates with various other devices over a transmission medium. For example, the transceiver 116 may send and receive commands via transmissions to and from a server or a remote device, such as remote device or server (not shown).

The behavioral forecast system 108 may include the processor 120 coupled to the computer-readable medium 114. The processor 120 may perform processing, including the execution of software stored on the computer-readable medium 114 providing functionality according to the disclosure. The software, when executed by the processor 120, causes the BMS 100 to perform the various functions described for a particular device, such as car 128, or any of the modules 102, 108, 114, 116, 118, 120, 122, 124, 126. The computer-readable medium 114 may also be used for storing data that is manipulated by the processor 120 when executing the software.

The sensor module 102 may be used to obtain battery measurements via different sensors, such as a first sensor 104, a second sensor 106. The first sensor 104 may be a voltage, current or other electrical sensor. The second sensor 106 may include a temperature sensor, thermometer, or the like. Of course, aspects of the present disclosure are not limited to the aforementioned sensors as other types of sensors, such as, for example, any sensors related to operation of a battery are also contemplated for either of the sensors 104, 106. The measurements of the sensors 104, 106 may be processed by one or more of the processor 120, the sensor module 102, the behavioral forecast system 108, the communication module 122, the location module 118, the locomotion module 126, the planning module 124, in conjunction with the computer-readable medium 114 to implement the functionality described herein. In one configuration, the data captured by the first sensor 104 and the second sensor 106, may be transmitted to an external device via the transceiver 116. The sensors 104, 106 may be coupled to the car 128 or may be in communication with the car 128.

The location module 118 may be used to determine a location of the car 128. For example, the location module 118 may use a global positioning system (GPS) to determine the location of the car 128. For example, the BMS 100 may be able to communicate with a remote monitoring service, such as mapping/navigation service, a weather service, or other environmental information provider.

The communication module 122 may be used to facilitate communications via the transceiver 116. For example, the communication module 122 may be configured to provide communication capabilities via different wireless protocols, such as Bluetooth, Wi-Fi, long term evolution (LTE), 3G, 5G, or the like. The communications module may also be configured to establish a communication channel between the car 128 and an information provider. The communication module 122 may also be used to communicate with other components of the car 128 that are not modules of the behavioral forecast system 108.

The planning module 124, as well as other modules described herein, may be software modules running in the processor 120, resident/stored in the computer-readable medium 114, one or more hardware modules coupled to the processor 120, or some combination thereof.

The behavioral forecast system 108 may be in communication with the sensor module 102, the transceiver 116, the processor 120, the communication module 122, the location module 118, the locomotion module 126, the planning module 124, and the computer-readable medium 114. In one configuration, the behavioral forecast system 108 may receive sensor data from the sensor module 102. The sensor module 102 may receive the sensor data from the sensors 104, 106, including battery data such as voltage, current and/or temperature. According to aspects of the disclosure, the sensor module 102 may filter the data to remove noise, encode the data, decode the data, merge the data, or perform other functions. In an alternate configuration, the behavioral forecast system 108 may receive sensor data directly from the sensors 104, 106.

As shown in FIG. 1, the behavioral forecast system 108 may receive battery data from the sensor module 102 including, for example, current, voltage, temperature, capacity, load, state-of-health (SOH) data, remaining useful life (RUL) data or the like. The sensor module 102 may be in communication with the battery 110 and the sensors 104, 106. According to one aspect, the sensors 104, 106 (and/or sensor module 102) may be included in the battery 110 or may be auxiliary sensors in communication with the battery 110 and sensor module 102. According to one aspect, the behavioral forecast system 108 may function to process data from the battery 110 to process and forecast a degradation or trajectory to failure of the battery. Moreover, while depicted as a standalone component, in one or more embodiments, the behavioral forecast system 108 may be integrated with the locomotion module 126, the sensor module 102, or another module of the vehicle 128. The noted functions and methods will become more apparent with a further discussion of the figures.

As described herein, aspects of the behavioral forecast system 108 provide a model framework and a class of machine learning algorithms that may use time-series data of fundamental battery measurements such as current, voltage, temperature, or the like, to forecast battery behavior. The behavioral forecast system 108 may include a convolutional neural network or a Gaussian-process convolutional neural network (CNN/GP-CNN 112, as described herein. The behavioral forecast system 108 may, using machine learning, forecast battery state-of-health (SOH) based on data measured over a finite window without need for costly, explicit diagnostic cycles. Additionally, the behavioral forecast system 108 may forecast a trajectory to failure or end of life under current and/or modified user behavior, for example, in second life applications.

According to one aspect, the behavioral forecast system 108 may include data collection and model training capabilities. For example, sensor data, such as current, voltage and temperature at a cell level, may be recorded by the BMS or an attached sensor module 102 or other module during the course of the life of a batch of electric vehicles, driven by different users, in different geographical locations over extended periods of time, for example between zero and three years. Data may be augmented with cell cycling data from a lab or other computational environment, mimicking driving conditions or loading profiles.

Figure 3A:
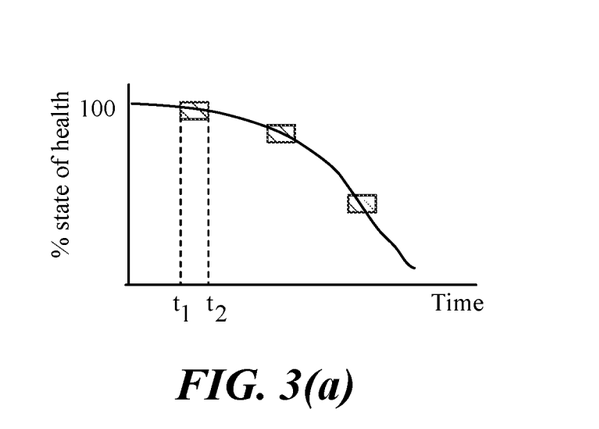
FIG. 3(a) is a plot of battery state-of-health versus time according to one aspect of the present disclosure.
Figure 3B:
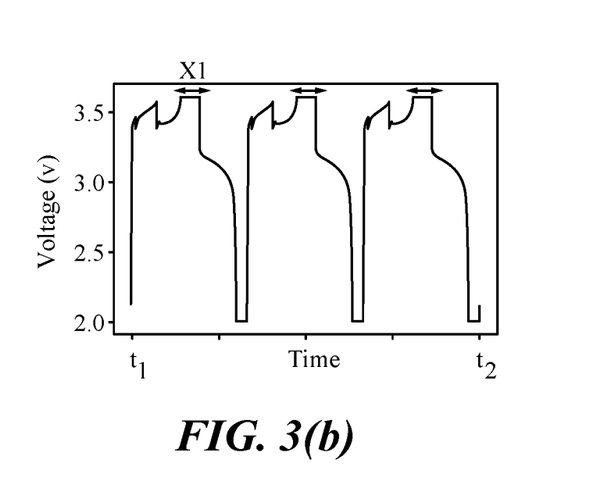
FIG. 3(b) is a plot of battery voltage versus time according to one aspect of the present disclosure.
Figure 3C:
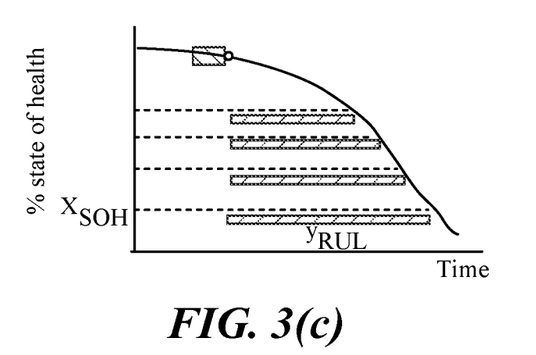
FIG. 3(c) is a plot of state-of-health versus time and remaining useful life according to one aspect of the present disclosure.
Figure 3D:
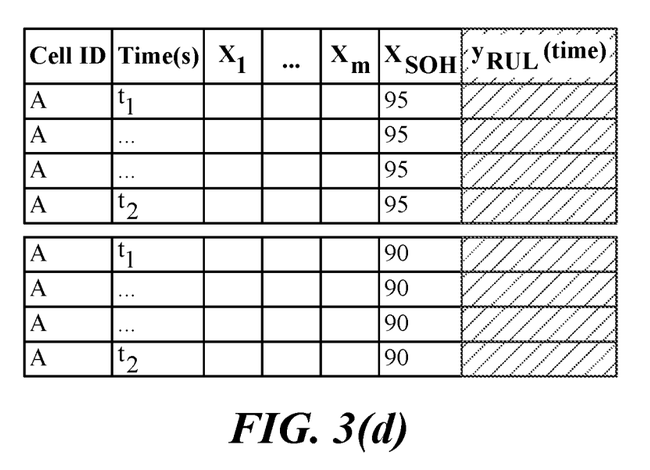
FIG. 3(d) is a sample set of training data according to one aspect of the present disclosure.

According to one aspect, time-based features from small segments of the charging and discharging portions may be extracted at different stages of life of the cells. These features may be directly recorded and reported from a vehicle, without complex data transformations that are lossy or lead to artifacts, or those that require perfect or complete data. According to one aspect, a vector of features may be generated for each cell at a point in time. For each element in the vector, evolution over time also may be recorded and used as "raw" data in the training dataset. (FIG. 3(*d*)).

According to another aspect, Gaussian Process regressors may be trained using the CNN/GP-CNN 112 on the features to generate SOH estimates as a function of future time, or predict the time taken to reach predefined health points.

According to one aspect in which the behavioral forecast system 108 is implemented in the car 128, once the Gaussian Processor (or another regressor) is trained, the model may be embedded in a BMS 100 or other onboard computing device. In the car 128, the BMS 100 and behavioral forecast system 108 may forecast, and continuously refine, the future trajectory of the vehicle as the sensor module 108 continually collects new data. Further, since training data will capture similar present and past states as the car 128, but different future use-cases, the model may offer the driver suggestions on how different use-patterns will improve or maximize certain performance metrics of one or more of the cells of a battery pack or module, for example, max power vs max capacity, per charge).

According to another aspect, behavioral forecast system 108 may use time-based features for the machine learning algorithms that do not require complete charge/discharge cycles to be predictive. Sample features include a change in current during a constant-voltage hold portion of charging, such as for example in the first 10 s, 30 s or other time interval. The delta current may capture the degradation of kinetic parameters in the system and may correlated with battery life.

According to another aspect, other physically-informed features may include, for example, time duration over 38 C, cell temperature at peak voltages, and temperature at peak currents to capture co-variance of fundamental system variables (as opposed to treating them independently). By explicitly including time as a variable, the behavioral forecast system 108 may be flexible to handle as much or as little of the data available with which to generate predictions. Thus, uncertainty estimates on predictions may be conditioned on amount of data available.

According to another aspect, implementation of Gaussian Process regression as a probabilistic technique may inherently capture a relation between similar points through covariance functions, and generate forecasts with error estimates. The behavioral forecast system's 108 use of a CNN architecture for capturing the temporal evolution of physically informed features may add to the model's predictive capability. According to one aspect, the CNN architecture may include a number of layers, for example:

Layer 1: a 1D convolutional layer (with strides of 2 and kernel size of 3, but may be tunable hyperparameters) and a Rectified Linear Unit (ReLU) activation Layer 2: Maxpool layer (reduces the dimensionality by 2×)

Layer 3: 1D convolutional layer (with strides of 2 and kernel size of 3, but may be tunable hyperparameters) and a ReLU activation Layer 3: Maxpool layer (reduces the dimensionality by 2×)

Layer 5: Fully connected layer with ReLU activation

Layer 6: Fully connected layer

According to one aspect, the convolution layers may capture how the signals evolve between time-steps, while the maxpool layers are meant to achieve compression of the data and prevent over-fitting. The convolutional layers are critical in capturing the temporal dependence of features. Depending on the dataset and number of points, one of skill in the art will recognize that the number of layers and the stride sizes may be varied to optimize the model.

According to another aspect, training data may be assembled from batteries or cells which have been used until their end of life, so that ground-truth may be available (i.e. the time taken to reach set values of SOH).

According to another aspect, the behavioral forecast system 108 may accommodate imperfect or limited data and also variable usage profile over time. Such a functionality may be particularly useful for real-world implementation where user behavior may evolve over time. The behavioral forecast system 108 may also forecast future behavior based on small time-window of measurements taken at any state of the lifecycle of the cell, without having knowledge of its prior history until that point. Further, the behavioral forecast system 108 may implement a novel feature extraction technique that uses both 'physically' important yet easily measurable features (in a car) and their evolution over time to capture the hysteric nature of battery performance degradation over a wide range of possibilities.

Figure 2:
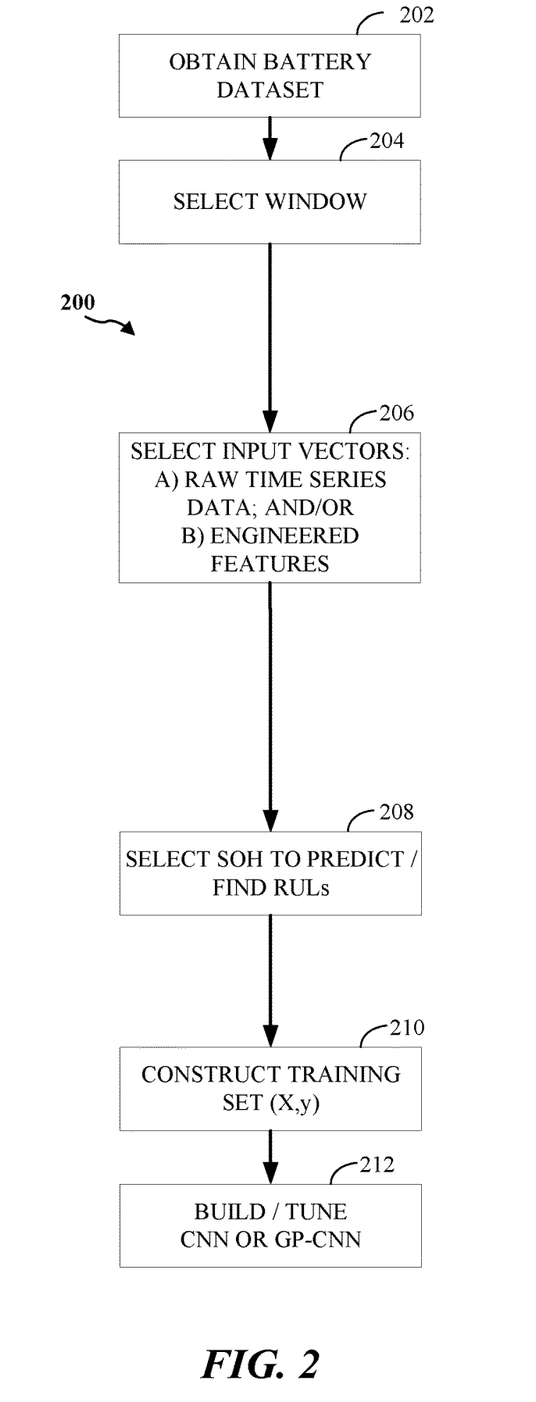
FIG. 2 is a flow diagram of forecasting battery state-of-health according to one aspect of the present disclosure.

FIG. 2 depicts a flow diagram 200 of forecasting battery state-of-health according to one aspect of the present disclosure. FIGS. 3(a)-3(d) depict representative and corresponding plots and tables of the flow 200. As shown in block 202 the system may obtain a battery training dataset. The training data set may include a variety of cells cycled to end-of-life and stressed under varying load profiles. According to one aspect, electrochemical measurements collected during the cycling/operation of the battery cell, including time-series of current, voltage, and temperature may be processed through a data-cleaning pipeline into standard data-structures.

The data-structures may contain data in a format more conducive for machine learning. For example, the data structures may ensure that the time-series are of the same length across cycles, or contain the same window of time, or same resolution for example. The data structures may also use some domain knowledge to interpolate derived metrics such as capacity (current integrated over time) over voltage or time to obtain some summary statistics. For instance, one metric may be the amount of time the battery takes to charge from 3.5 to 4.1 V at constant current, or amount of time the battery takes to reach either zero current or a certain value of current at a constant voltage hold, as two examples.

As shown in block 204, a sliding window (commensurate with the duration of data desired to train a model) is selected from the dataset to define a blob of training dataset 302, with one of more outcomes. Training data sets 302 are depicted as the selected SOH data between two time intervals, $t_1$ and $t_2$, shown in the plot of percentage SOH vs. time in FIG. 3(a). The time-windows may be chosen arbitrarily to obtain features for model training. Further, the available data may be from any window of lifetime and may not require complete historical data.

An outcome may be a static prediction or dynamic (or continuous or rolling prediction). A static prediction may take some time window of data and predict the time taken for a cell to reach a threshold life, or SOH at a future time. Dynamic/continuous predictions take this a considerable step further by using historical data (allowing the use of any arbitrary window of time) and forecasting the trajectory the cell takes to reach end-of-life. As such, and shown in block 206, input vectors may be selected in the form of raw time-series data and/or engineered features within the window of time are used as a training dataset, along with their time-stamps relative to a reference age of the cell. The input vectors may be raw time-series data, such as vector X1 depicted in the Voltage (V) vs. Time ($t_1$ to $t_2$) plot of FIG. 3(b). Alternatively or additionally, the input vectors may include feature engineering along time domain (i.e., interpolation along time domain to ensure a uniformly space intervals, or interpolation along voltage axis to ensure important electrochemical signatures are captured, without requiring complete cycles or the full range of charge/discharge. The outcomes may be one or more future times at which a predicted SOH is desired.

As shown in block 208, during training one or more future SOHs may be selected and input as a variable. Doing so may allow the ability to predict the remaining-useful-life (RUL) corresponding to the multiple input SOHs (i.e., trajectory of degradation), based on the limited window of data. Representative RULs 304 are depicted as $y_{RUL}$ as a function of SOH ($X_{SOH}$) in the percentage SOH vs time plot of FIG. 3(c).

As shown in block 210, a training set (X, y) (FIG. 3(d)) may be constructed. While traditional machine learning approaches may take the training dataset as independent points, aspects of the present disclosure may use the convolutional layers in such a manner to capture how the features evolve over time instead of collapsing them into a summary statistic. The CNN weights may be optimized through backpropagation. Alternatively, the output from the CNN may be piped into a Gaussian Process (GP), and the weights may be optimized in a similar manner. GP, in one aspect, may provide uncertainty estimates.

The convolutional layers may also be used to capture how both the inter-cycle, and intra-cycle convolutions may affect future health of a battery, which may change fundamentally depending on the sequence of its loading/usage history. The number, stride and kernel size of the convolution layers may be tuned to capture both short and long-term aging effects within the time window of measurement. As shown in block 212, the CNN/GP-CNN may be tuned after its initial build training the model on additional data. Once the model is fit, for a given window of measurement in test dataset and current SOH, the time taken to reach any future SOH can be estimated. That is, the model trained on data from arbitrarily long windows and at different stages of a battery life, inference of a SOH may be faster and more efficient.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of forecasting a state-of-health for a vehicle battery, the method comprising:
   obtaining a first battery dataset assembled from one or more vehicle battery cells;
   selecting an arbitrary time window from a subset of the first battery dataset, including historical data;
   selecting at least one feature from the arbitrary time window;
   structuring the subset for feature extraction by a convolutional filter;
   capturing an evolution of the at least one feature using the convolutional filter;
   generating a state-of-health model; training the state-of-health (SOH) model by inputting the at least one feature, the evolution of the at least one feature, and a ground truth future state-of-health as variables, in which the state-of-health model comprises a gaussian-process convolutional neural network (GP-CNN) having convolutional layers, tuned to capture short-term and long-term aging effects within the arbitrary time window of measurement;
   training a gaussian process regressor using the GP-CNN to generate SOH estimates to capture a relation between identified points through covariance functions, and generate forecasts with error estimates;
   embedding a gaussian process regressor in a battery management system of a vehicle; and
   predicting, using electrochemical measurements collected during cycling/operation of battery cells of a vehicle battery of the vehicle, a trajectory to failure for the vehicle battery based on the gaussian process regressor.

2. The method of claim 1 wherein the at least one feature includes a time-stamp relative to a reference age of a vehicle battery cell.

3. The method of claim 1 wherein the at least one feature is a raw time-series.

4. The method of claim 1 wherein the at least one feature comprises current data.

5. The method of claim 1 wherein the at least one feature comprises voltage data.

6. The method of claim 1 wherein the at least one feature comprises temperature data.

7. The method of claim 1 wherein the at least one feature comprises a derived metric.

8. The method of claim 1 wherein the at least one feature comprises a change in current during a constant-voltage hold.

9. The method of claim 1 wherein the evolution is a temporal evolution.

10. The method of claim 1 further comprising generating a recommendation from the state-of-health model to maximize battery performance.

11. The method of claim 1 wherein the one or more vehicle battery cells are cycled to end-of-life.

12. The method of claim 1 further comprising tuning the convolutional neural network using a second dataset.

13. A system for forecasting a state-of-health for a vehicle battery, comprising: one or more processors; a memory communicably coupled to the one or more processors and storing:
   a behavioral forecast system including instructions that when executed by the one or more processors cause the one or more processors to generate trajectory to failure of the vehicle battery by:
   obtaining a first battery dataset assembled from one or more vehicle battery cells;
   selecting an arbitrary time window from a subset of the first battery dataset, including historical data;
   selecting at least one feature from the arbitrary time window; structuring the subset for feature extraction by a convolutional filter;
   capturing an evolution of the at least one feature using the convolutional filter;
   generating a state-of-health model;
   training the state-of-health (SOH) model by inputting the at least one feature, the evolution of the at least one feature, and a ground truth future state-of-health as variables, in which the state-of-health model comprises a gaussian-process convolutional neural network (GP-CNN) having convolutional layers tuned to capture short-term and long-term aging effects within the arbitrary time window of measurement;
   training a gaussian process regressor using the GP-CNN to generate SOH estimates to capture a relation between identified points through covariance functions, and
   generate forecasts with error estimates embedding a gaussian process regressor in a battery management system of a vehicle; and
   predicting, using electrochemical measurements collected during cycling/operation of battery cells of a vehicle battery of the vehicle, a trajectory to failure for the vehicle battery based on the gaussian process regressor.

14. A battery monitoring system of a vehicle comprising: one or more processors;
   a memory communicably coupled to the one or more processors and storing:
   a behavioral forecast system including instructions that when executed by the one or more processors cause the one or more processors to generate a trajectory to failure of the battery by:
   obtaining a first battery dataset assembled from one or more vehicle battery cells;
   selecting an arbitrary time window from a subset of the first battery dataset, including historical data;
   selecting at least one feature from the arbitrary time window, the at least one feature comprising at least one of current data, voltage data, capacity data, temperature data or an engineered metric;
   structuring the subset for feature extraction by a convolutional filter;
   capturing an evolution of the at least one feature using the convolutional filter;
   generating a state-of-health model;
   training the state-of-health (SOH) model by inputting the at least one feature, the evolution of the at least one feature, and a ground truth future state-of-health as variables, in which the state-of-health model comprises a gaussian-process convolutional neural network (GP-CNN) having convolutional layers-tuned to capture short-term and long-term aging effects within the arbitrary time window of measurement;

training a gaussian process regressor using the GP-CNN to generate SOH estimates to capture a relation between identified points through covariance functions, and generate forecasts with error estimates;

embedding a gaussian process regressor in a battery management system of the vehicle; and predicting, using electrochemical measurements collected during cycling/operation of battery cells of a vehicle battery of the vehicle, a trajectory to failure for the vehicle battery to enable a second life battery application based on the gaussian process regressor.

* * * * *